INVENTOR
PAUL H. FREY
BY
ATTORNEY

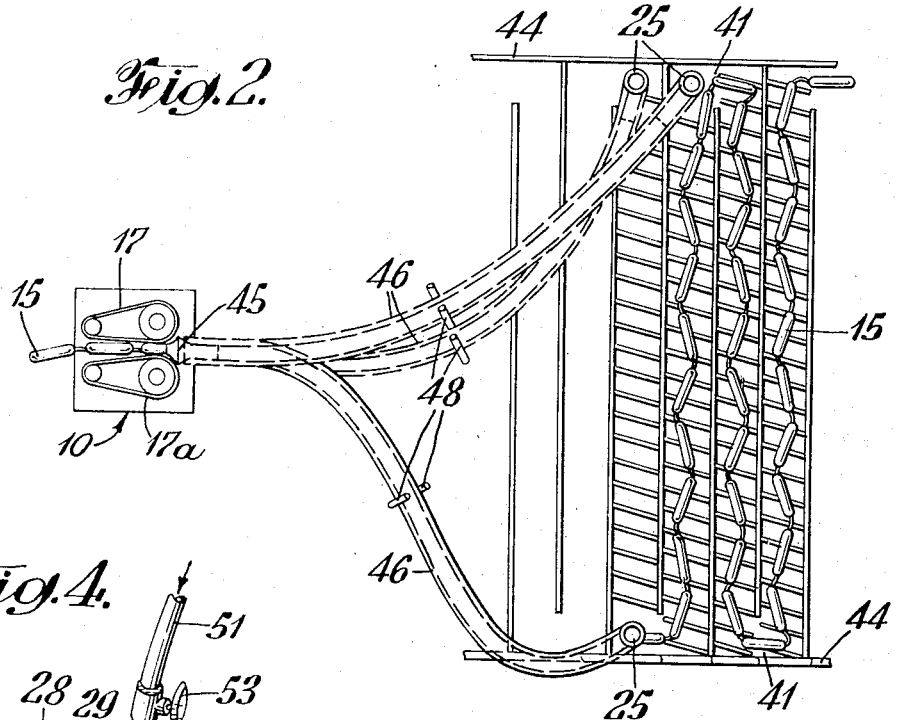
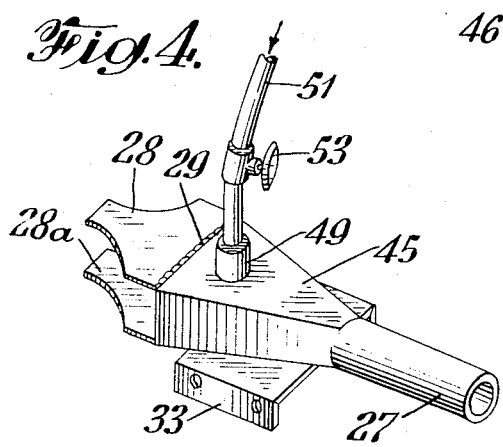
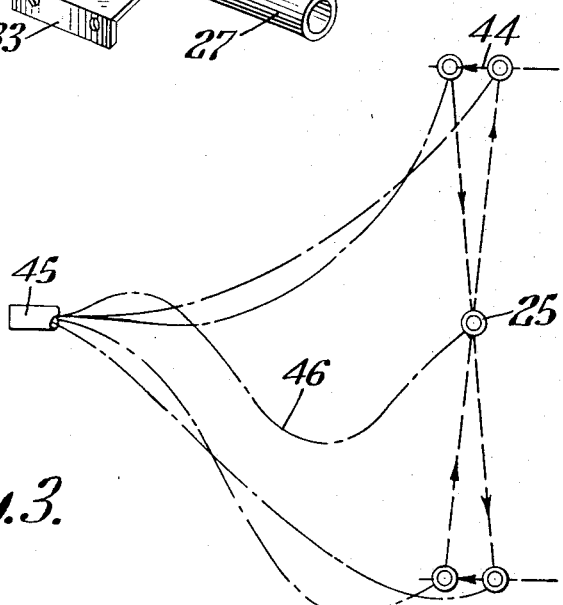

United States Patent Office

3,360,172
Patented Dec. 26, 1967

3,360,172
FRANKFURTER STRAND FEEDER
Paul H. Frey, La Grange, Ill., assignor to Union Carbide Corporation, a corporation of New York
Filed Nov. 26, 1965, Ser. No. 509,858
8 Claims. (Cl. 226—97)

This invention relates to continuous frankfurter strand feeder apparatus which are employed for processing encased meat emulsions by cooking and/or smoking said encased meat emulsions. More particularly, this invention relates to a feed unit in continuous frankfurter strand feeder apparatus which feed unit is capable of accepting, metering and uniformly distributing a string of encased meat emulsion onto a continuously advancing conveyor at the input end of a processing chamber.

In continuous frankfurter strand feeder apparatus, such as that described in U.S. Patent 3,223,531, there is generally provided a continuously advancing conveyor onto which a string of linked, encased meat emulsion is fed and distributed before being processed in smoking and cooking chambers. The feed unit of the apparatus set forth in U.S. Patent 3,223,531, comprises, generally, a rigid support means containing an open belt conveyor which carries the linked string of encased meat emulsion from a metering unit to a continuously advancing basket conveyor. The feed unit is pivotably mounted at the end adjacent the metering unit and, in operation, is caused to oscillate in a direction transverse to the direction of the advancing basket conveyor and thereby deposit the string of linked encased meat emulsion onto the basket conveyor at a rate faster than the rate at which the basket conveyor is advanced. That is, the output end of the feed unit is reciprocated back and forth along the length of each successive unit basket in the basket conveyor as the conveyor advances and is thus caused to describe a generally X-shaped motion pattern. In this manner, the feed unit is capable of delivering and overfeeding a string of linked encased meat emulsion, such as frankfurters, to each individually and successively advanced basket comprising the basket conveyor. Due to the oscillating movement of this feed unit and overfeeding of the string, the string of linked encased meat emulsion is continuously delivered to each unit basket so that the string of encased meat emulsion forms an undulating wave pattern in each unit and concomittantly forms a generally sinusoidal wave in the basket conveyor similar to a modulated wave.

Although the apparatus described in U.S. Patent 3,223,-531 has generally overcome the problems of shrinkage of encased meat emulsion by overfeeding a string of encased meat emulsion and delivering it into successive unit baskets, variations in length between the input end and the output end of the fed unit employed has sometimes resulted in undesirable variations in the length of said string at it is deposited in the basket conveyor. These variations in length have also sometimes resulted in jamming of the string between the outlet end of the open belt conveyor and the output end of the feed unit.

It is an object of the present invention, therefor, to provide a means for maintaining a constant and uniform inventory of a string of encased meat emulsion in the feed unit of a continuous frankfurter strand feeder apparatus.

Another object is to provide an improved feed unit in a continuous frankfurter strand feeder apparatus which is capable of uniformly depositing a string of encased meat emulsion on a continuously advancing conveyor.

These and further objects of the present invention will become more clear from the ensuing discussion.

It has now been found that the objects of the present invention can be generally accomplished by providing a flexible feed unit in a continuous frankfurter strand feeder apparatus. The flexible feed unit generally comprises a tube of constant length having a smooth interior surface and an inside diameter of a size sufficient to permit a string of encased meat emulsion, such as an articulated, linked strand of frankfurters, to be freely guided and advanced therethrough without jamming. The wall of the flexible conduit comprising the feed unit should also be of sufficient thickness so that the flexible conduit is substantially self-supporting and semi-rigid while retaining a substantially circular cross-section without buckling or kinking when in use.

The present invention will become more clear when considered together with the accompanying drawing wherein.

FIGURE 2 is a schematic plan view of the flexible feed unit of the present invention;

FIGURE 3 is a schematic plan view illustrating the motion pattern of the constant length flexible feed unit of the present invention; and FIGURE 4 is an enlarged isometric view of the product funnel comprising the inlet end of the flexible feed unit of the present invention.

Figure 1:
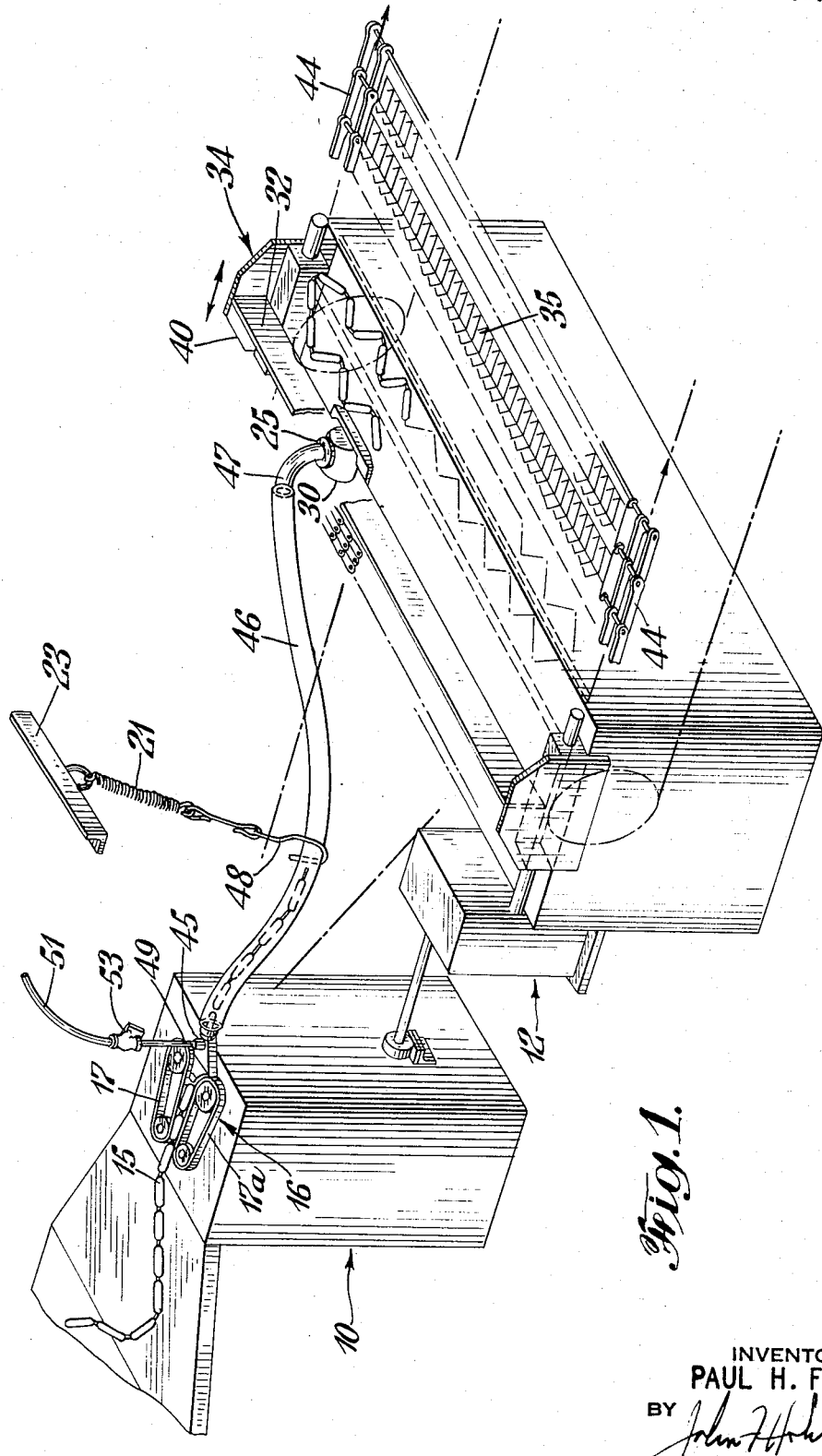
FIGURE 1 is an isometric view of a continuous frankfurter strand feeder apparatus illustrating one embodiment of the present invention.

Turning now to the drawing, wherein like reference numerals denote like parts, there is shown in FIGURE 1 a metering unit generally designated by reference numeral 10. Mounted atop the metering unit 10 is a metering belt assembly 16 comprising opposed belts 17 and 17a which are adapted to grip and advance a linked string of encased meat emulsion 15, such as frankfurters, and feed it into an inlet funnel 45. The improved feed unit of the present invention, comprises a flexible conduit 46 which is shouldered onto the outlet end of a funnel 45 and secured thereto by, for example, clamp means (not shown). The other end of flexible conduit 46 is similarly shouldered onto an elbow 47 to provide a smooth, continuous connecting surface with the input and output means of the apparatus.

In order to provide additional support for flexible conduit 46, a cradling hook 48 is positioned intermediate the ends of flexible conduit 46. Cradling hook 48 is, in turn supported by a suitable suspension means such as, for example, an extensible cable and spring means 21, suspended from a bracket 23 so that the flexible conduit is maintained in a slightly downwardly inclined plane from its input end to its output end during operation.

The flexible conduit 46 of the present invention preferably comprises a constant length tube having a smooth interior surface and an inside diameter of an optimum size to guide a string of linked encased meat emulsion, such as frankfurters, and slide them therethrough without interference, obstruction or jamming. If the inside diameter of the flexible conduit 46 is too large, the articulated encased meat emulsion is not adequately guided central to the flexible tubings' axis and the individual, articulated links of the encased meat emulsion may tend to fold over each other at their connecting points, and jam.

Hence, in order to insure free passage of a strand of linked encased meat emulsion through the flexible conduit 46, it has been found that a flexible conduit having an inside diameter of about 150% greater than the diameter of the encased meat emulsion being transported therethrough is suitable. For example, when feeding linked frankfurters having a diameter of between about ⅝ inch to 1.0 inch, a flexible conduit having an inside diameter of between about 1.0 inch to 1.50 inch has been found to be satisfactory. While the inside diameter of the flexible conduit is not critical, it should be understood that the inside diameter should not be so narrow as to constrict or slow down the rate at which the linked encased meat emulsion is fed therethrough, nor so large as to result in a flexible conduit which is bulky or unwieldy, or which will not permit the articulated meat emulsion to be guided therethrough without jamming.

It has been found that a tubing length of between about 105% to 125% of the distance between the metering means 10 and the extreme distant position of the distributing guide elbow 47 is desirable to shape the tubing into a shallow S-curve that can be maintained substantially planar and permit the linked strand of encased meat emulsion to be smoothly advanced therethrough without causing the flexible tubular conduit to whip during oscillation of the output means.

As will be described in greater detail hereinbelow, the body of the flexible conduit 46 is oscillated during operation. Hence, the flexible conduit should also be capable of retaining a substantially circular cross-section without buckling or kinking when in use. It has been found that this can be achieved by providing a flexible conduit having a wall thickness of from between about 30% to 40% of the inside diameter of the flexible conduit. For example, a flexible conduit having an inside diameter of between about 1.0 inch to 1.75 inches would have a corresponding wall thickness of from between ⅜ inch to ⅝ inch.

With reference again to FIGURE 1, elbow 47 is pivotably mounted to the distributing guide 25 of cross carriage 30. Cross carriage 30 is slidably mounted on transverse slide rail 32 which, in turn, is fastened at each end of the side plates 40 of the indexing carriage generally designated as 34.

The basket conveyor of the apparatus shown comprises, generally, a pair of spaced roller chains 44 to which are fastened elongate basket units 35 flexible connected to each other. The unit baskets 35 generally comprise a wire lattice structure having a floor and a pair of opposed, elbowed side walls so that the interior portion of the baskets have a wide mid-portion and a narrow inlet opposite the floor of the baskets.

As shown in FIGURE 2, a passage 41 is formed in the side walls at the end of each unit basket 35, the passage 41 in one basket being at the opposite end of the passage 41 in an adjoining unit basket. In this manner, a strand of linked encased meat emulsion 15, such as frankfurters, can be delivered through the narrow passage at the top of each unit basket 35 and loosely deposited on the floor thereof with sufficient slack in the strand to permit it to be reversed loosely through passage 41 connecting with the next succeeding unit basket and similarly deposited therein in a direction opposite the immediately preceeding basket. In this manner, the strand is deposited in the successive unit baskets in undulating and generally sinusoidal wave patterns.

The lattice wire structure, forming each of the unit baskets 35, supports the strand of linked, encased meat emulsion deposited therein as the basket conveyor is moved upwardly, downwardly and horizontally through the cooking chambers. For example, the strands of encased meat emulsion are supported first by the wires comprising the floor, then by one side wall and finally by the opposed side wall of each unit basket successively during its course of transit through the processing chambers. In a preferred basket construction, the wires comprising the floor of each unit basket are obliquely disposed to the axis of the conveyor's advance and the portions of such wires comprising the side walls are displaced relative to the floor, to each other and to the conveyor's axis. In this manner, the sliding and rolling movement of the linked, encased meat emulsion, relative to the movement of the floor and walls of the unit baskets, permits different portions of the surfaces of the linked, encased meat emulsion to be exposed to the smoke and/or heat of the processing chambers resulting in a uniform color and skin formation of the thusly processed linked, encased meat emulsion.

It should be understod, however, that other types of basket constructions and conveyor means can be used with the flexible conduit feeder means of this invention. For example, commercially available conveyors which employ transversely extending elongate rods or hooks to festoon therefrom a string of encased meat emulsion can be similarly employed.

Referring again to FIGURE 1, the cross carriage 30 is reciprocated in a direction transverse to the direction of the basket conveyor by a drive means 12 and a trip mechanism (not shown). In this manner, the cross carriage 30 is concurrently and intermittently connected to successive links of roller chain 44 and is thereby indexed to the next succeeding unit basket being advanced. This is more clearly illustrated in FIGURES 2 and 3 where the flexible conduit 46 is first being indexed at one end of a unit basket and, after being traversed by cross carriage 30, is indexed at the opposite end of the next succeeding unit basket. Hence, through the operation of cross carriage 30, the body of the flexible conduit 46 is oscillated while its output end is reciprocated. Since the flexible conduit is of contsant length, the output end of flexible conduit 46 describes a generally X-shaped motion pattern while the body of the flexible conduit is oscillated and assumes varying configurations while remaining in a substantially downwardly inclined plane (FIGURE 3).

Referring now to FIGURE 4 there is shown a funnel, generally designated by reference numeral 45, equipped with a connecting tube 27 at its discharge end. The connecting tube 27 is adapted to fit into and communicate with the shouldered input end of the flexible conduit 46 to provide a smooth, continuous interior connecting surface with flexible conduit 46. The inlet end of funnel 45 is equipped with a pair of funnel skirts 28 and 28a which are adapted to mount the funnel 45 proximal to the belts 17 and 17a of the metering unit 10. The upper funnel skirt 28 is provided with a hinge 29 to facilitate threading up of the string of linked, encased meat emulsion. The hinged, upper funnel skirt 28 can also be connected to cooperate with the drive means of the apparatus such that when the hinged funnel skirt 28 is opened beyond a predetermined position for manual threading of the string of linked, encased meat emulsion or when the metering unit 10 malfunctions, the drive means of the apparatus is de-energized and all operations of the apparatus are halted. This can be readily accomplished by providing a limit switch and relay positioned to cooperate with the hinged, upper funnel skirt 28 or by any other means well known to those skilled in the art. After the string of linked, encased meat emulsion has been manually threaded or the malfunction of the metering means 10 has been cleared, the hinged, upper funnel skirt 28 can be returned to its normal operating position and automatically re-energize the drive means starting up the operation of the apparatus.

A mounting bracket 33 is affixed to the bottom of funnel 45 for securing the funnel 45 to the metering unit 10. A threaded pipe nipple 49 is positioned in the upper surface of funnel 45 providing a passage to the interior of funnel 45 and a connection for a water pipe 51. A valve 53 is also provided in order to regulate the flow of water being introduced to the funnel 45 and thence to flexible conduit 46. Water is thusly admitted to funnel 45 simultaneously and concurrently with the passage of a strand of linked, encased meat emulsion therethrough and in this manner, acts as a lubricant to assist the strand of linked encased meat emulsion in transit through the flexible conduit 46.

Although water has been described as the lubricant employed in this embodiment of the present invention, it should be understood that other lubricants can be similarly employed to obtain the same results.

In operation, the basket conveyor of the continuous frankfurter strand feeder apparatus described hereinabove and as set forth in U.S. Patent 3,223,531 is advanced toward cooking chambers in a direction away from the output end of the flexible conduit 46. As the basket conveyor is thusly advanced, a strand of linked encased meat emulsion 15, such as frankfurters, is supplied from a suitable source, passed between the opposed gripping belts 17 and 17a mounted atop the metering unit 10, guided into the inlet end of funnel 45 and thence through the connecting tube 27 and into the inlet end of flexible conduit 46. The strand of linked encased meat emulsion 15 is then fed into the inlet end of the flexible conduit 46 and valve 53 is opened to admit a flow of water into the inlet end of flexible conduit 46. As the strand of linked encased meat emulsion 15 is transported through flexible conduit 46, the outlet end of flexible conduit 46 is reciprocated in a direction transverse to the direction of travel of the basket conveyor by means of the cross carriage 30, which is powered by drive means 12, acting in conjunction with the transverse slide rail 32.

Simultaneously, the body of the flexible conduit 46; that is, the portion of the flexible conduit contained between its inlet and outlet ends, is oscillated following the reciprocating movement of its outlet end. During advancement of the basket conveyor by means of the spaced roller chains 44, the cross carriage 30 is indexed, by means of the indexing carriage 34, at that end of each unit basket 35 in which passage 41 is located. In this manner, the outlet end of flexible conduit 46 is constrained to a motion pattern generally describing an X-shaped path as it is indexed first at one end of a unit basket then at the opposite end of the next succeeding unit basket and so on as each unit basket is advanced.

Since the linked strand of encased meat emulsion 15 is fed through flexible conduit 46 at a rate slightly in excess of the linear motion of its outlet end, the strand of linked encased meat emulsion 15 deposited in the successive unit baskets forms an undulating and generally sinusoidal curve so that the undulating strand in one unit basket 35 is directly opposite that in the next succeeding unit basket.

The elbow 47 can be pivotally journaled in distributing guide 25 and be constrained in its rotation to minimize any whipping action imparted to the body of the flexible conduit 46 by its oscillating movement. The distributing guide 25 acts to assist in guiding the delivery to and depost of the continuous strand of linked encased meat emulsion in each unit basket.

The cradle hook 48 is adjusted to support the flexible conduit 46 so that it slopes slightly downward from the horizontal from its inlet end at the funnel 45 to its outlet end at the elbow 47. The substantially planar downward slope of flexible conduit 46 acts to assist the smooth advancement of the strand of linked encased meat emulsion therethrough. The cradle hook 48 can also act to constrain the movement of the body of the flexible conduit 46 during its oscillation.

As will be apparent to those skilled in the art, the dimensions of the flexible conduit 46, such as length, inside diameter and wall thickness, will be somewhat dependent upon the width of the conveyor system employed, the distance of cross carriage 30 from the inlet end, and the diameter of the encased meat emulsion to be transported therethrough. For example, in a conveyor system measuring from betwen about 5 feet to 8 feet in width, where the distance between the cross carriage and the inlet end is about 5 feet, and into which is fed an encased meat emulsion having a diameter of from between about ⅝ inch to 1.0 inch, it has ben found that a flexible conduit having a length of between about 6 feet to about 8.5 feet, an inside diameter of about 1½ inches and a wall thickness of about ½ inch will function satisfactorily. Hence, the dimensions of the flexible conduit to be employed in a particular conveyor system can be readily ascertained by those skilled in the art.

Since the flexible conduit will contact a food product which will subsequently be ingested, it should preferably consist of a sanitary composition; that is, a composition which is characterized by being readily capable of being kept clean. Commercially available tubing fabricated from modified synthetic organic vinyl plastic which has been approved by the Federal Food and Drug Administration is particularly preferred.

It should be understood that while the improved feed unit of the present invention has been described with reference to linked, encased meat emulsions, it can be similarly and advantageously employed with continuous strand of encased meat emulsions which are not linked, segmented or articulated; such as, for example, Vienna sausages.

It can be seen, therefor, that by employing the improved feed unit of the present invention in a continuous frankfurter strand feeder apparatus, a constant and uniform inventory of an encased meat emulsion can be supplied between a source of supply and a continuously advancing conveyor system. Furthermore, the improved feed unit of the present invention also provides for loose but uniform deposition of a strand of linked encased meat emulsion in such a conveyor system. Additionally, the feed unit of the present invention will result in economic savings of equipment and shut down time for repairs and maintenance since the feed unit is less costly to install and is relatively free of mechanical components which might otherwise require constant servicing and maintenance.

While the present invention has been described with particularity and in some detail, it should be understood that changes, modifications and variations can be made therein without departing from the scope and spirit of the invention.

What is claimed is:

1. In an apparatus consisting essentially of, in combination;
   (a) a conveyor means in which a continuous strand of encased meat emulsion is deposited and carried therein for subsequent processing; and
   (b) a metering means for feeding said continuous strand of encased meat emulsion from a source of supply;
   the improvement comprising, in combination;
   (c) a flexible tubular feed unit of constant length having an inside diameter of a size sufficient to permit a strand of encased meat emulsion to be freely guided and fed therethrough without interference, obstruction and jamming and having an inlet end and an outlet end through which said continuous strand of encased meat emulsion is transported from said metering means to said conveyor means, said inlet end being equipped with means to accept said continuous strand of encased meat emulsion from said metering means and said outlet end being attached to means capable of reciprocating said outlet end relative to successive portions of said conveyor means.

2. The apparatus of claim 1 wherein the outlet end of said flexible feed unit is attached to reciprocating means capable of reciprocating said outlet end transverse to the direction of travel of a conveyor means comprising unit baskets such that said continuous strand of encased meat emulsion is continuously delivered to and deposited in each unit basket of said conveyor means in uniform lengths and at a uniform rate, first in one direction and then in the opposite direction of each of said unit baskets.

3. The apparatus of claim 1 wherein the flexible tubular feed unit has a substantially circular cross-section, a smooth interior surface and a wall thickness capable of imparting semi-rigidity to said flexible feed unit and retain its substantially circular cross-section such that the body of said flexible feed unit does not buckle and kink during oscillation thereof.

4. The apparatus of claim 1 wherein said flexible feed unit is maintained intermediate its ends such that said flexible feed unit is in a substantially downwardly inclined plane.

5. The apparatus of claim 1 wherein the means which accepts said continuous strand of encased meat emulsion from said metering means comprises, a funnel having an inlet end and an outlet end and which is mounted to said metering means, the inlet end of said funnel being equipped with skirt means adapted to cooperate with said metering means and the outlet end of said funnel being equipped with a connecting tube which is secured to and cooperates with the inlet end of said flexible conduit such that the continuous strand of encased meat emulsion is readily accepted by said skirt means, is freely passed through the body of said funnel and through said connecting tube and is introduced into the interior of said flexible feed unit at its inlet end.

6. The apparatus of claim 1 wherein the flexible tubular feed unit has an inside diameter about 150% greater than the diameter of the encased meat emulsion transported therethrough.

7. The apparatus of claim 6 wherein said funnel is equipped with means to admit a lubricant therein concurrently with the passage of said continuous strand of encased meat emulsion therethrough.

8. The apparatus of claim 6 wherein said skirt means is hingeably connected to the inlet end of said funnel and connected to drive means from said apparatus such that movement of said hingeably connected skirt means beyond a predetermined position de-energizes said drive means halting the operation of said apparatus until said hingeably connected skirt means is returned to its normal operating position.

References Cited
UNITED STATES PATENTS

| | | | |
|---|---|---|---|
| 2,694,217 | 11/1954 | Anderson | 17—1 |
| 3,223,531 | 12/1965 | Kugler | 99—443 |

M. HENSON, WOOD, JR., *Primary Examiner.*

R. A. SCHACHER, *Assistant Examiner.*